(12) United States Patent
Murao

(10) Patent No.: US 9,307,155 B2
(45) Date of Patent: Apr. 5, 2016

(54) METHOD OF DETERMINING EXPOSURE CONTROL VALUE FOR VEHICLE-MOUNTED CAMERA

(75) Inventor: Toshikazu Murao, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 396 days.

(21) Appl. No.: 13/333,042

(22) Filed: Dec. 21, 2011

(65) Prior Publication Data

US 2012/0162426 A1 Jun. 28, 2012

(30) Foreign Application Priority Data

Dec. 24, 2010 (JP) ................................. 2010-288638

(51) Int. Cl.
*H04N 7/18* (2006.01)
*H04N 5/235* (2006.01)
*H04N 5/232* (2006.01)

(52) U.S. Cl.
CPC ............ *H04N 5/235* (2013.01); *H04N 5/23219* (2013.01)

(58) Field of Classification Search
CPC .... B60R 1/00; B60R 2300/105; B60R 11/04; B60R 2300/802; H04N 7/181
USPC ........................................................ 348/148
See application file for complete search history.

(56) References Cited

U.S. PATENT DOCUMENTS

| 7,986,808 B2* | 7/2011 | Ikeda ............................ 382/103 |
| 2009/0174808 A1* | 7/2009 | Mochida et al. .............. 348/362 |
| 2010/0082281 A1* | 4/2010 | Nakamura et al. ............. 702/95 |
| 2011/0242323 A1 | 10/2011 | Liu |

FOREIGN PATENT DOCUMENTS

| EP | 1074430 | 10/2007 |
| JP | 2005-079684 | 3/2005 |
| JP | 4179142 | 9/2008 |
| JP | 2010-109883 | 5/2010 |
| WO | WO2010/082277 | 7/2010 |

OTHER PUBLICATIONS

Notification of Reasons for Rejection issued Nov. 22, 2012 in corresponding Japanese Application No. 2010-288638 with English translation.

* cited by examiner

*Primary Examiner* — William C Vaughn, Jr.
*Assistant Examiner* — Daniel Tekle
(74) *Attorney, Agent, or Firm* — Harness, Dickey & Pierce, P.L.C.

(57) ABSTRACT

The method is for determining an exposure control value for controlling exposure of a camera mounted on a vehicle to take images in the vicinity of the vehicle. The method includes a detection step of detecting a target from a taken image which the camera has taken in a state where the target is disposed within a image-taking area of the camera, a measurement step of measuring brightness of the target in the taken image, and a calculation step of calculating the exposure control value to such a value that the brightness of the target becomes equal to a target brightness appropriate for recognizing the target.

7 Claims, 5 Drawing Sheets

METHOD OF DETERMINING EXPOSURE CONTROL VALUE FOR VEHICLE-MOUNTED CAMERA This application claims priority to Japanese Patent Application No. 2010-288638 filed on Dec. 24, 2010, the entire contents of which are hereby incorporated by reference.

BACKGROUND OF THE INVENTION

1. Field of the Invention

The present disclosure relates to a method of determining an exposure control value for a vehicle-mounted camera, which is appropriate for recognizing a target in an image in the vicinity of the vehicle taken by the camera.

2. Description of Related Art

It is known to mount a camera on a vehicle to take images in the vicinity of the vehicle. For example, the camera is mounted on the vehicle to take images ahead of the vehicle for the purpose of recognizing a white line painted on a road surface or a three-dimensional object such as a preceding or oncoming vehicle. Incidentally, it is not possible to determine with a high degree of accuracy a distance to a recognized object based on the coordinates of the object in an image taken by a vehicle-mounted camera due to installation tolerance in the optical axis of the camera. Accordingly, optical axis adjustment has to be performed for every vehicle at vehicle manufacturing factories or vehicle dealers. Generally, a target of a pattern including bright portions (white areas) and a dark portion (black area) is disposed in a predetermined position with respect to a vehicle-mounted camera, and optical-axis adjustment is performed based on the coordinates of these portions in an image taken by the camera.

However, to perform the optical-axis adjustment with a high degree of accuracy, the exposure control value for the camera has to be set to a value appropriate for recognizing the target. The exposure control value appropriate for recognizing the target is not constant, but varies depending on the environment of the target such as background noise. For example, in general exposure control in which the whole area of a taken image is set as a photometric area, when the background is dark, since the exposure is set aiming at the dark background, the white areas of a taken image of the target saturate, and accordingly expand more than in reality. On the other hand, when the background is bright, since the exposure is set aiming at the bright background, the contrast between the white and black areas in a taken image of the target is lowered. As explained above, if the exposure control value is not set appropriately, since it is not possible to accurately recognize the boundary between the white and black areas, the optical-axis adjustment cannot be performed with a high degree of accuracy.

Japanese Patent No. 4179142 describes a method capable of dealing with such a problem. In this method, an area within which a target is assumed to be located in an image taken by a camera mounted on a vehicle ("target location area" hereinafter) is set in advance based on the positional relationship between the camera and the target, and the exposure control value is calculated so that the mean value of the pixels included in the target location area becomes a predetermined value. Also, EP Patent No. 1074430 describes a method in which the exposure control is performed based on brightness histogram of a photometric area in a taken image excluding an object to be recognized.

The former conventional method has a problem in that since the target location area is set in advance based on the positional relationship between the vehicle-mounted camera and the target, and the size of the target, part of the background of the target may be included in the target location area due to placement error of the target. The latter conventional method is a method in which the exposure control is performed based on the brightness of the background, and accordingly has the problem described above.

SUMMARY

An exemplary embodiment provides a method of determining an exposure control value for controlling exposure of a camera mounted on a vehicle to take images in the vicinity of the vehicle, comprising:

a detection step of detecting a target from a taken image which the camera has taken in a state where the target is disposed within a image-taking area of the camera;

a measurement step of measuring brightness of the target in the taken image; and a calculation step of calculating the exposure control value to such a value that the brightness of the target becomes equal to a target brightness appropriate for recognizing the target.

According to the exemplary embodiment, it is possible to determine an exposure control value for a vehicle-mounted camera appropriately for recognizing a target including a predetermined brightness pattern without being affected by the environment of the target such background noise.

Other advantages and features of the exemplary embodiment will become apparent from the following description including the drawings and claims.

PREFERRED EMBODIMENTS OF THE INVENTION

Figure 1:
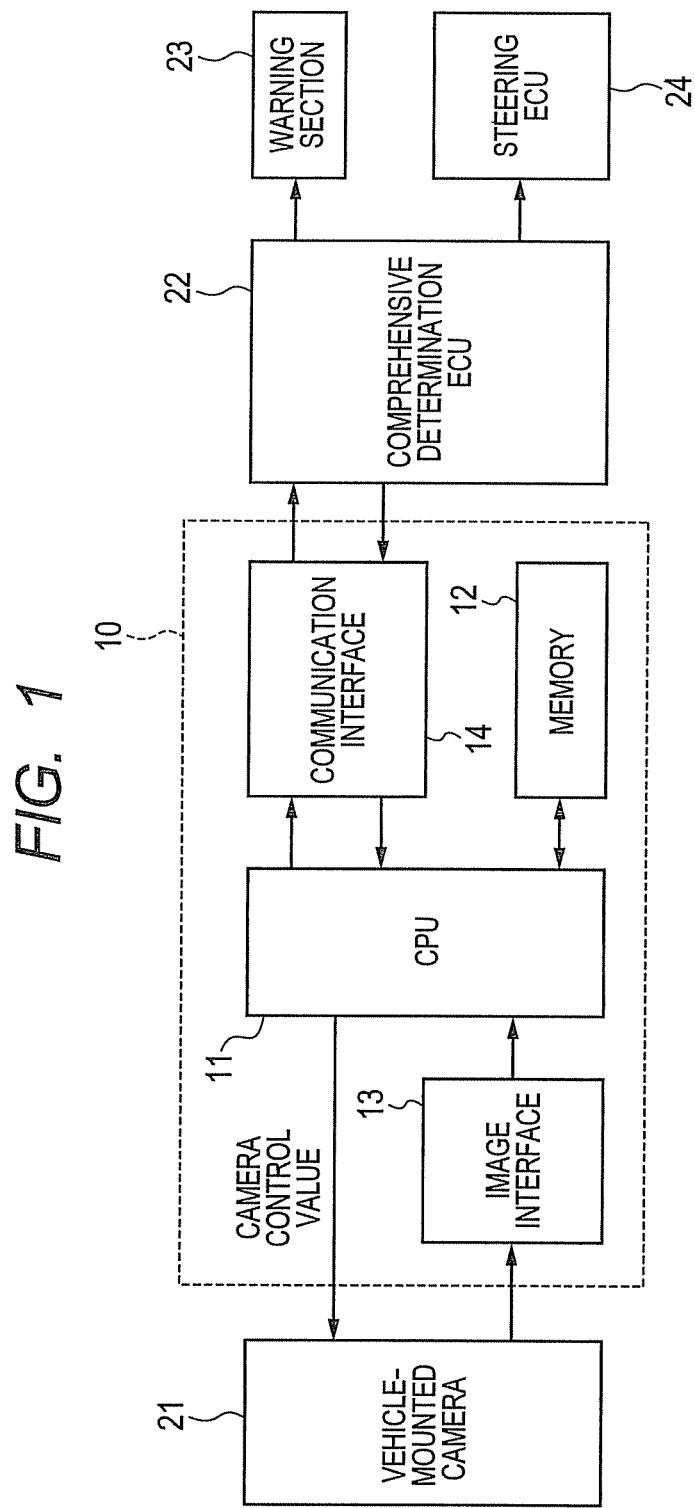
FIG. 1 is a block diagram showing the structure of an exposure control apparatus for performing the method of determining an exposure control value according to an embodiment of the invention.

FIG. 1 is a block diagram showing the structure of an exposure control apparatus 10 for performing the method of determining an exposure control value according to an embodiment of the invention.

The exposure control apparatus 10 is mounted on a vehicle to be used for performing a warning process and steering control based on recognition of the landscape ahead of the vehicle in cooperation with a vehicle-mounted camera 21, a comprehensive determination ECU 22, a warning section 23 and a steering ECU 24.

The exposure control apparatus 10 includes a CPU 11, a memory 12, an image interface 13 for receiving images taken by the camera 21 and a communication interface 14 for performing communication with the comprehensive determination ECU 22.

The camera 21 is located at a position inside the vehicle cabin, which is appropriate for taking an image of the road ahead of the vehicle, for example, on the back of the rear-view mirror. The camera 21 is oriented such that its image-taking area corresponds to a predetermined area ahead of the vehicle.

The camera 21 includes, in addition to a CCD image sensor or a CMOS image sensor, an amplifier and an A/D converter. The amplifier and the A/D converter are for amplifying analog signals showing luminance of each of the pixels constituting an image taken by the image sensor by a predetermined gain, and converting the amplified analog signals into digital pixel values. The camera 21 outputs the digital pixel values as image signals for each horizontal line for each image.

The image interface 13 is inputted with the digital pixel values and the horizontal and vertical sync signals outputted form the camera 21. The CPU 11 recognizes which of the vertical and horizontal pixel positions the pixel values outputted for each horizontal line correspond to, based on the horizontal and vertical sync signals. The pixel values are stored in the memory 12 while being associated with their pixel positions.

The CPU 11 processes the image signals having been outputted from the camera 21 and stored in the memory 12 to recognize the position of an object to be recognized (a preceding vehicle in this embodiment), and output a signal indicative of the position of a recognized object to the comprehensive determination ECU 22. The CPU also performs exposure control of the camera 21 in order that a preceding vehicle can be properly recognized. More specifically, the CPU 11 outputs, to the camera 21, camera control values including adjustment command values based on which the exposure time (shutter speed) and frame rate of the camera 21, and the gain of the amplifier are adjusted.

The communication interface 14 is for intermediating communication between the CPU 11 and the comprehensive determination ECU 22. In this embodiment, the CPU 11 outputs a signal indicative of the position a recognized preceding vehicle in a taken image to the comprehensive determination ECU 22. The comprehensive determination ECU 22 determines whether there is possibility that the own vehicle (the vehicle on which the exposure control apparatus 10 is mounted) will contact the preceding vehicle, and commands the warning section 23 to issue warning upon determining that there is possibility of contact with the preceding vehicle. Further, when the possibility is high, in addition to commanding the warning section 23 to issue warning, the comprehensive determination ECU 22 commands the steering ECU 24 to adjust an assist amount for the steering apparatus, or directly drive the steering apparatus to avoid danger.

Figure 2:
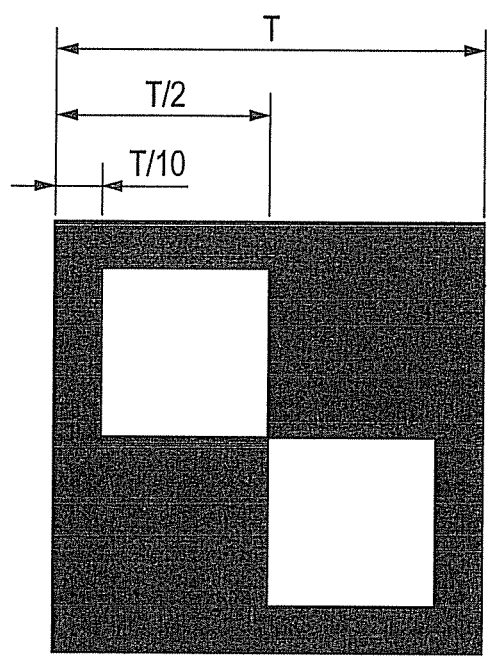
FIG. 2 is a diagram showing a pattern of a target used in performing the method according to the embodiment.

Next, a method of determining the exposure control value performed prior to adjusting the optical axis of the camera 21 is explained. Since it is not possible to determine with a high degree of accuracy a distance to a recognized object based on the coordinate of the object in a taken image due to installation tolerance of the camera 21 in the optical axis. Accordingly, optical axis adjustment is performed for every vehicle at vehicle manufacturing factories or vehicle dealers. The optical-axis adjustment begins by taking an image of a target disposed at a predetermined position with respect to a vehicle. FIG. 2 is a diagram showing the pattern of the target. The pattern includes two white squares (two bright square portions) located on a black square (a dark square portion) measuring T by T. The two white squares are disposed so as to be diagonally opposite to each other with respect to the center of the black square.

The optical axis adjustment is performed based on an image of the target taken by the camera 21. However, if the exposure control value by which exposure of the camera 21 is set is not appropriate for recognizing the object, it is not possible to accurately recognize the boundary between the black square and the white squares.

That is, to perform the optical-axis adjustment with a high degree of accuracy, since a clear and sharp image of the target has to be taken, it is necessary to determine the exposure control value appropriate for recognizing the object before performing the optical axis adjustment. Accordingly, in this embodiment, exposure control for light axis adjustment is performed to determine the exposure control value appropriate for recognizing the object prior to the light axis adjustment.

Figure 3:
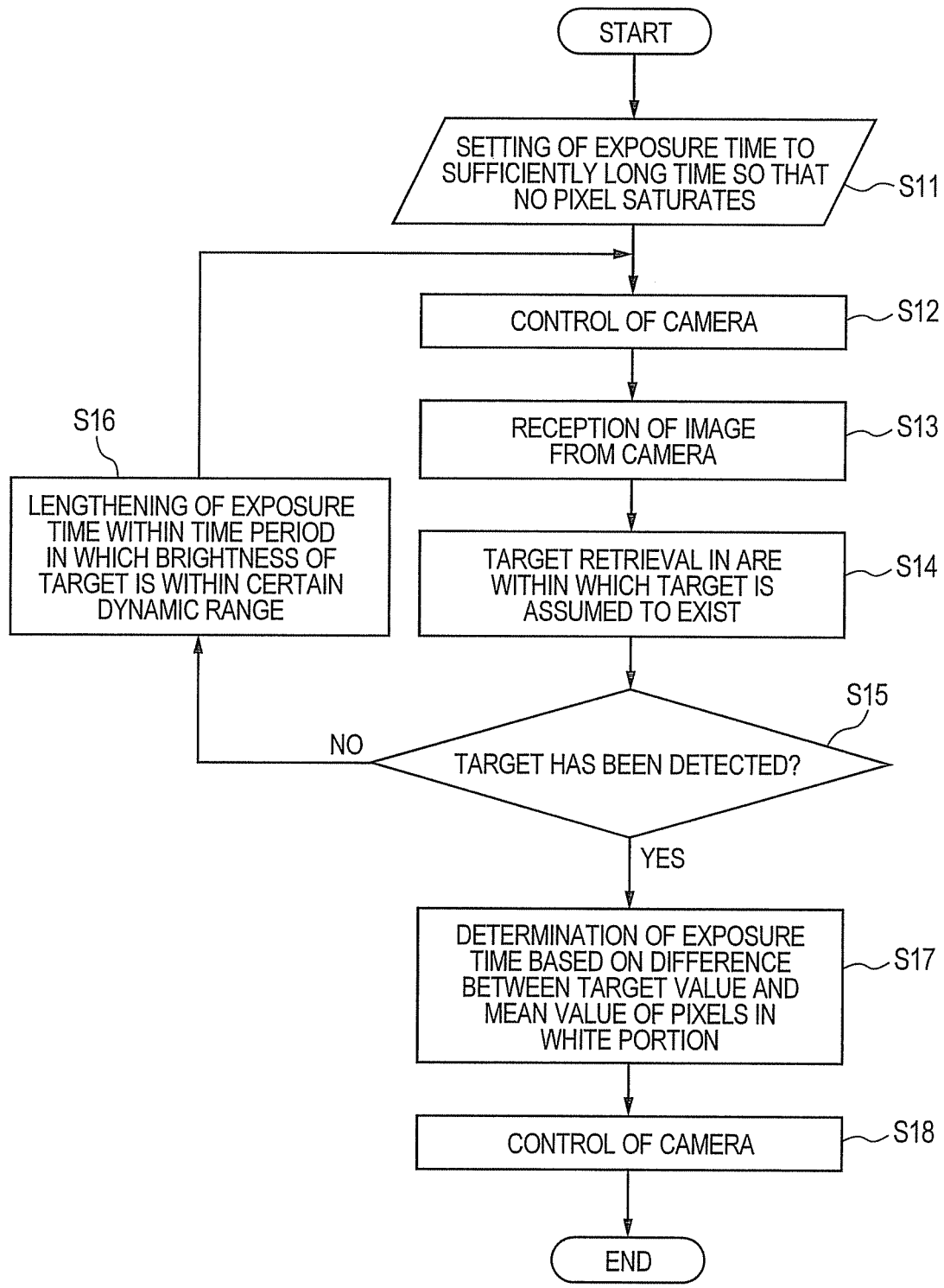
FIG. 3 is a flowchart showing a process of exposure control for optical axis adjustment performed by the exposure control apparatus.

FIG. 3 is a flowchart showing the process of the exposure control for optical axis adjustment which the CPU 11 performs in accordance with a program stored in the memory. This process is performed in the state in which the target shown in FIG. 2 is located within the image-taking area of the camera 21.

The process begins in step S11 where the exposure time of the camera 21 is set sufficiently short so that none of the pixels of a taken image saturates. That is, the initial exposure control value is set to such a value that an image taken by the camera 21 is sufficiently dark.

In subsequent step S12, the exposure control of the camera 21 is performed in accordance with the exposure control value set in step S11 (or the value set in the later explained step S16). Subsequently, an image taken by the camera S12 having been exposure-controlled in step S12 is acquired.

Figure 4:
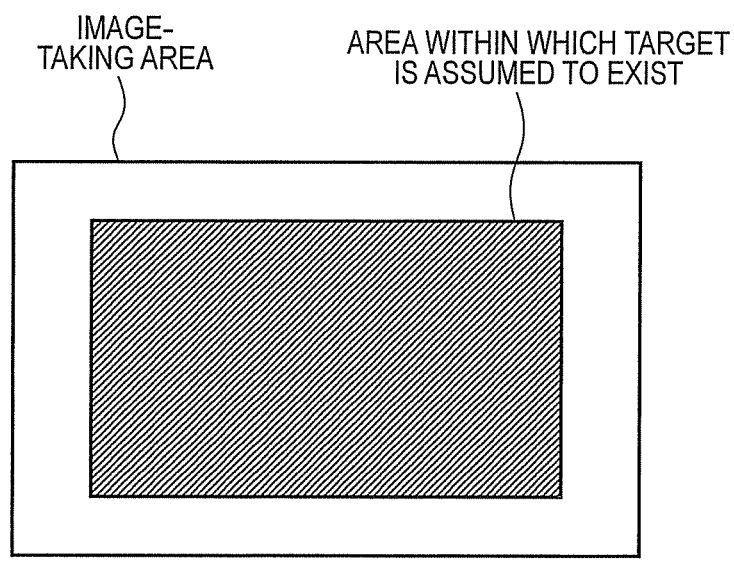
FIG. 4 is a diagram showing an area within which the target can exist in an image taken by a vehicle-mounted camera.
Figure 5A:
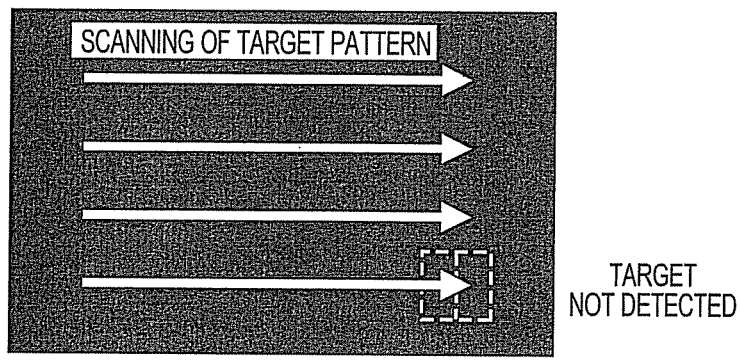
FIG. 5A is a diagram showing a process for retrieving the target from an image taken by the camera at the initial exposure control value.
Figure 5B:
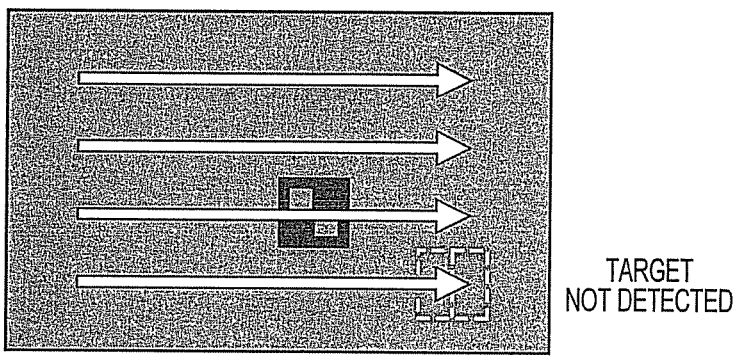
FIG. 5B is a diagram showing a process for retrieving the target from an image taken by the camera at the exposure control value set so that the taken image is brighter than the taken image shown in FIG. 5A.
Figure 5C:
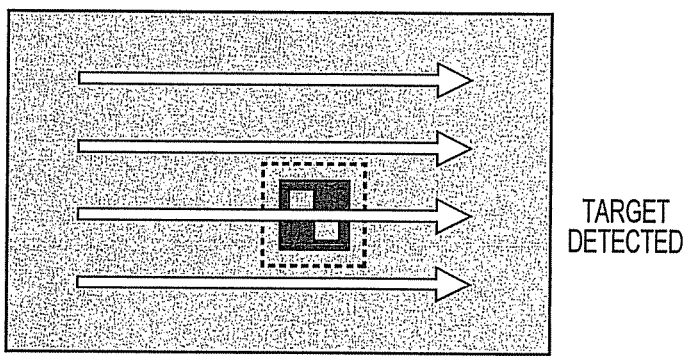
FIG. 5C is a diagram showing a process for retrieving the target from an image taken by the camera at the exposure control value set so that the taken image is brighter than the taken image shown in FIG. 5B.
Figure 5D:
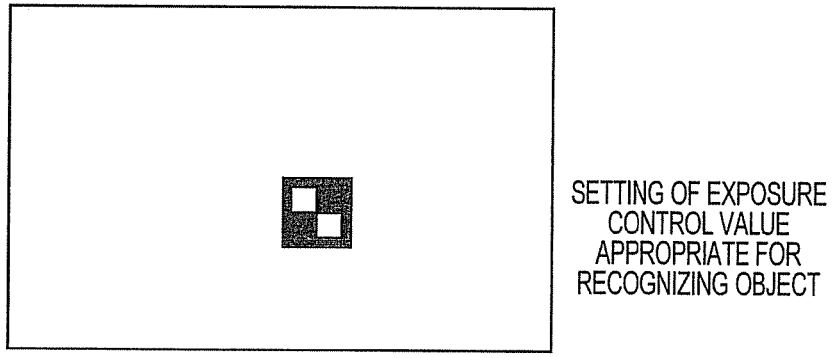
FIG. 5D is a diagram showing an image taken by the camera at the exposure control value set to a value appropriate for recognizing the target.

In subsequent step S14, the target is retrieved by scanning the taken image acquired in step S13 to detect the pattern of the target. At this time, since the object and the camera 21 are in a predetermined positional relationship (which is not required to be as accurate as that required in the optical axis adjustment), the area within which the target is assumed to exist in the taken image can be narrowed down to some extent. Accordingly, the target retrieval is performed within a part of the taken image corresponding to the area within which the target is assumed to exist, as shown in FIG. 4.

Subsequently, it is determined in step S15 whether or not the target has been detected from the taken image in step S14. If the determination result in step S15 is negative, the process proceeds to step S16 to change the exposure control value so that the exposure time is lengthened within a time period in which the target is within a certain luminance dynamic range. Step S16 is performed repeatedly so that taken images become gradually brighter. Thereafter, the process returns to step S12 so that the above operations are performed again.

If the determination result in step S15 is affirmative, the process proceeds to step S17 to measure the luminance of the white areas (bright portions) of the target, and to determine the exposure control value appropriate for recognizing the target based on the measured luminance. More specifically, the mean value of the values of the pixels within the white areas is calculated, and the exposure control value is determined based on the difference between the calculated mean value and a predetermined target value. Thereafter, the process is terminated.

The above embodiment provides the following advantages. As explained above, the method of determining the exposure control value of this embodiment is configured to set the initial exposure control value to such a value that an image taken by the camera 21 is sufficiently dark so that none of the pixels saturates, and the taken image is scanned to retrieve the target. If the target has not been detected, the exposure control value is changed repeatedly so that the taken images gradually become brighter until the target is detected. Accordingly, it is possible to prevent a taken image from becoming excessively bright and prevent the pixels showing the target from saturating.

Further, since the target is retrieved from a part of a taken image, in which the target is assumed to exist, it is possible to reduce process load necessary to retrieve the target.

The method of this embodiment is configured to detect the target from an image which the camera 21 has taken in the state in which the target is disposed within the image-taking area of the camera 21, measure the luminance of the target in the taken image, and calculate the exposure control value so that the brightness of an image of the target becomes equal to the target value appropriate for recognizing the target. That is, in this embodiment, since the target is detected from a taken image, and the brightness of the image of the target is measured, it is possible to calculate the exposure control value based on the measured luminance of the target exclusive of the background. Accordingly, it is possible to determine the exposure control values appropriate for recognizing the target without being affected by the environment of the target. By using the exposure control value determined in this way, since a clear and sharp image of the target can be obtained, the optical axis adjustment can be performed with a high degree of accuracy.

In addition, since the luminance of the white areas of the target (the mean value of the pixels) is measured, it is possible to obtain the brightness of the target reliably and correctly.

Other Embodiments

It is a matter of course that various modifications can be made to the above described embodiment as described below.

The pattern of the object shown in FIG. 2 is only an example, and not limited thereto. The method of determining the exposure control value of the invention can be used for other than the light axis adjustment.

In the above embodiment, the vehicle-mounted camera 21 is used for recognizing a preceding vehicle to perform a warning process and steering control. However, the vehicle-mounted camera may be used for recognizing a white line painted on the road surface to perform a warning process and steering control. Further, the present invention can be practiced using a camera mounted on a vehicle for taking images in the vicinity of the vehicle, other than in front of the vehicle, for example, behind the vehicle.

The above explained preferred embodiments are exemplary of the invention of the present application which is described solely by the claims appended below. It should be understood that modifications of the preferred embodiments may be made as would occur to one of skill in the art.

What is claimed is:

1. A method of determining an exposure control value for controlling exposure of a camera mounted on a vehicle to take images in the vicinity of the vehicle, comprising:
    a detection step of detecting a target from a taken image which the camera has taken in a state where the target is disposed within an image-taking area of the camera;
    a measurement step of measuring brightness of the target in the taken image;
    a calculation step of calculating the exposure control value to such a value that the brightness of the target becomes equal to a target brightness appropriate for recognizing the target; and
    setting the exposure control value depending on whether or not the target is detected,
    wherein the detection step includes a retrieval step of retrieving the target from the taken image, and an adjustment step of adjusting the exposure control value if the target has not been retrieved in the retrieval step, the retrieval step and the adjustment step being performed each time the camera takes an image until the target is retrieved,
    wherein the method further comprises a setting step of setting the exposure control value to an initial value thereof before performing the detection step, so that the taken image is sufficiently dark to such an extent that none of pixels of the taken image saturates, and
    wherein the target is detected from a single one of taken images in the detection step, the target includes a pattern including a bright portion and a dark portion for adjusting an optical axis of the camera, a brightness of the bright portion of the target being measured in the measurement step, and the adjustment step being performed each time the camera takes an image so that taken images become gradually brighter.

2. The method according to claim 1, wherein, in the retrieval step, the target is retrieved from a part of a taken image, within which the target is assumed to exist.

3. A method of determining an exposure control value for controlling exposure of a camera mounted on a vehicle to take images in the vicinity of the vehicle, comprising:
    a detection step of detecting a target from a taken image which the camera has taken in a state where the target is disposed within an image-taking area of the camera;
    a measurement step of measuring brightness of the target in the taken image;
    a calculation step of calculating the exposure control value to such a value that the brightness of the target becomes equal to a target brightness appropriate for recognizing the target; and
    setting the exposure control value depending on whether or not the target is detected,
        wherein the detection step includes a retrieval step of retrieving the target from the taken image, and an adjustment step of adjusting the exposure control value if the target has not been retrieved in the retrieval step, the retrieval step and the adjustment step being performed each time the camera takes an image until the target is retrieved,
        wherein, in the retrieval step, the target is retrieved from a part of a taken image, within which the target is assumed to exist, and
        wherein the target is detected from a single one of taken images in the detection step, the target includes a pattern including a bright portion and a dark portion for adjusting an optical axis of the camera, a brightness of the bright portion of the target is measured in the measurement step, and the adjustment step being performed each time the camera takes an image so that taken images become gradually brighter.

4. The method according to claim 3, wherein luminance of the bright portion of the target is measured in the calculation step to calculate the exposure control value.

5. A method of determining an exposure control value for controlling exposure of a camera mounted on a vehicle to take images in the vicinity of the vehicle, comprising:
- a detection step of detecting a target from a taken image which the camera has taken in a state where the target is disposed within an image-taking area of the camera;
- a measurement step of measuring brightness of the target in the taken image;
- a calculation step of calculating the exposure control value to such a value that the brightness of the target becomes equal to a target brightness appropriate for recognizing the target; and
- setting the exposure control value depending on whether or not the target is detected,
  - wherein the target is detected from a single one of taken images in the detection step, the target includes a pattern including a bright portion and a dark portion for adjusting an optical axis of the camera, luminance of the bright portion of the target is measured in the calculation step to calculate the exposure control value, a brightness of the bright portion of the target is measured in the measurement step, and the adjustment step being performed each time the camera takes an image so that taken images become gradually brighter.

6. The method according to claim 5, wherein the detection step includes a retrieval step of retrieving the target from the taken image, and an adjustment step of adjusting the exposure control value if the target has not been retrieved in the retrieval step, the retrieval step and the adjustment step being performed each time the camera takes an image until the target is retrieved.

7. A method of determining an exposure control value for controlling exposure of a camera mounted on a vehicle to take images in the vicinity of the vehicle, comprising:
- a detection step of detecting a target from a taken image which the camera has taken in a state where the target is disposed within an image-taking area of the camera; and
- a measurement step of measuring brightness of the target in the taken image; and
- setting the exposure control value depending on whether or not the target is detected,
- wherein the detection step includes a retrieval step of retrieving the target from the taken image, and an adjustment step of adjusting the exposure control value if the target has not been retrieved in the retrieval step, the retrieval step and the adjustment step being performed each time the camera takes an image until the target is retrieved,
- wherein the method further comprises a setting step of setting the exposure control value to an initial value thereof before performing the detection step, so that the taken image is sufficiently dark to such an extent that none of pixels of the taken image saturates, and
- wherein the target is detected from a single one of taken images in the detection step, the target includes a pattern including a bright portion and a dark portion for adjusting an optical axis of the camera, a brightness of the bright portion of the target being measured in the measurement step, and the adjustment step being performed each time the camera takes an image so that taken images become gradually brighter.

* * * * *